`US008401689B1`

(12) United States Patent
Cawley et al.

(10) Patent No.: US 8,401,689 B1
(45) Date of Patent: Mar. 19, 2013

(54) DYNAMIC GLOBAL SCHEDULER SYSTEM FOR A GLASS PRODUCTION LINE

(75) Inventors: Patrick M Cawley, Baden, PA (US); Phillip David Plant, Zelienople, PA (US); Akos Nagy, Zelienople, PA (US)

(73) Assignee: HP3 Software, Inc., Pittsburgh, PA (US)

( * ) Notice: Subject to any disclaimer, the term of this patent is extended or adjusted under 35 U.S.C. 154(b) by 914 days.

(21) Appl. No.: 12/503,750

(22) Filed: Jul. 15, 2009

Related U.S. Application Data

(60) Provisional application No. 61/081,030, filed on Jul. 15, 2008.

(51) Int. Cl.
*G06F 19/00* (2006.01)
(52) U.S. Cl. .................... 700/157; 700/101; 700/171
(58) Field of Classification Search ............ 700/99–102, 700/157, 158, 167, 171
See application file for complete search history.

(56) References Cited

U.S. PATENT DOCUMENTS

| 5,791,971 A | 8/1998 | Dickinson et al. |
| 6,463,762 B1 | 10/2002 | Ross, Jr. |
| 6,810,784 B1 | 11/2004 | Cunningham |
| 6,879,873 B2 | 4/2005 | Passant |
| 7,043,323 B2 | 5/2006 | Passant |
| 7,167,767 B2 * | 1/2007 | Clayton et al. ............... 700/100 |
| 2007/0112451 A1 * | 5/2007 | Clayton et al. ............... 700/100 |
| 2010/0070066 A1 * | 3/2010 | Wirsam et al. ............... 700/106 |

FOREIGN PATENT DOCUMENTS

WO    WO 2008/020005    * 2/2008

\* cited by examiner

*Primary Examiner* — Sean Shechtman
(74) *Attorney, Agent, or Firm* — Blynn L. Shideler; Krisanne Shideler; BLK Law Group

(57) ABSTRACT

A glass production line comprises a style of lean manufacturing to solve many of the inefficiencies in the scheduling of orders through a glass plant. The main goal of the global scheduler of the present invention will be to dynamically adjust the flow of glass through a glass plant for maximum efficiency.

1 Claim, 1 Drawing Sheet

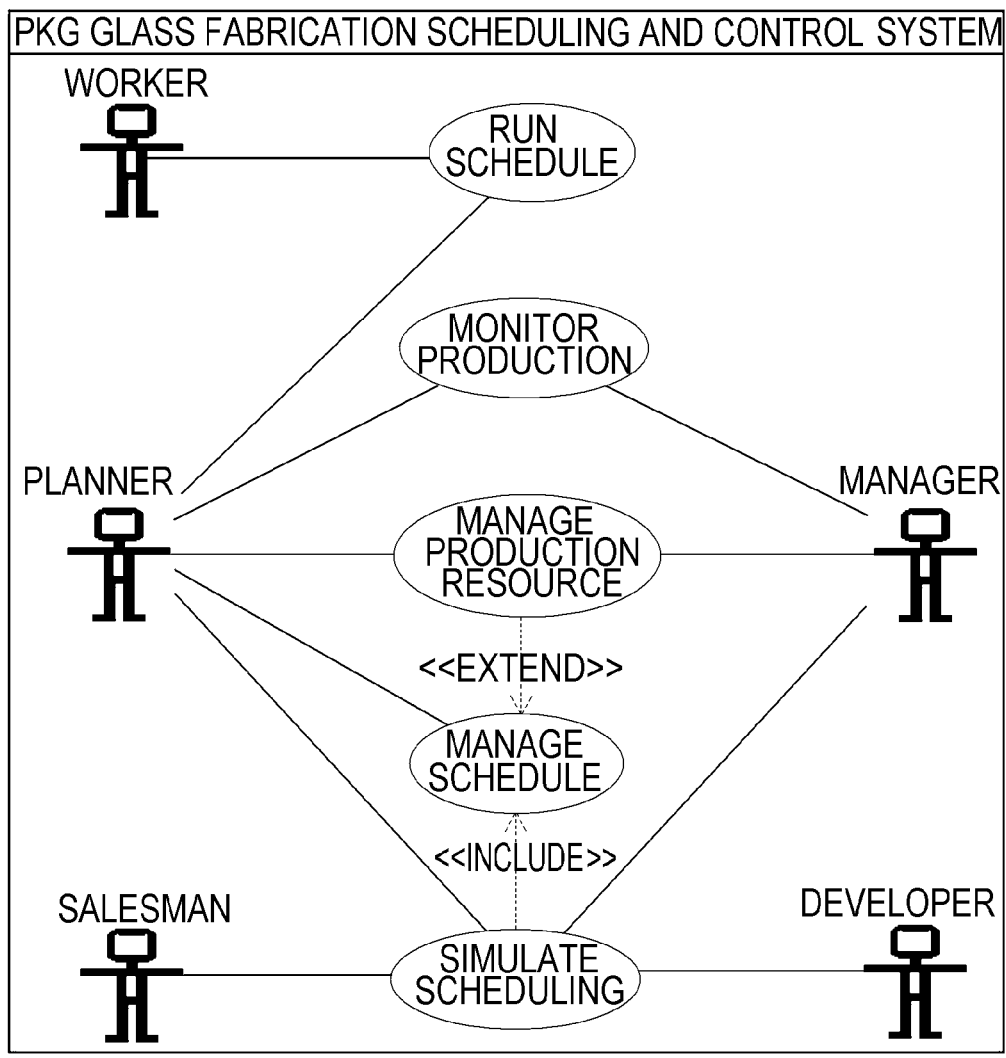

DYNAMIC GLOBAL SCHEDULER SYSTEM FOR A GLASS PRODUCTION LINE

RELATED APPLICATIONS

The present application claims the benefit of provisional patent application Ser. No. 61/081,030 filed Jul. 15, 2008 entitled "Dynamic Global Scheduler System for a Glass Production Line."

BACKGROUND OF THE INVENTION

1. Field of the Invention

The present invention relates to glass processing equipment with dynamic production control. Specifically, the invention relates to a dynamic global scheduler for a cutting line.

2. Background Information

Glass processing equipment includes glass cutting lines. Glass cutting lines are well known in the industry and include a variety of machines. One typical component or machine of a glass cutting line includes a cutting table having a movable cutting head (such as though an XY positioning system) configured to cut glass work pieces on the table. Glass cutting tables are available from the assignee of this invention, Billco Manufacturing, Inc. (Billco) and others. Examples of glass cutting lines are described in U.S. Pat. Nos. 5,791,971, 6,463, 762 and 6,810,784, which are incorporated herein by reference.

Within the meaning of this application glass cutting table is a glass processing apparatus that is configured to score or cut glass work pieces according to predefined patterns. The cutting patterns are determined by the particular orders needed and are generally prepared by a glass optimizing system that forms a schedule, such as developed by Billco and available from HP3 Software under the Batch Ban® trademark. An XY cutting head is a glass cutting or scoring device, e.g. cutting wheel, which is movable within the XY plane to cut the work piece, typically by having a bridge extend across the table for movement along one axis and a carriage moveable along the bridge in the second axis. The cutting head generally can also move into and out of engagement with the work piece along a third (z) axis, and are generally numerically controlled according to the predetermined cutting pattern. It is possible, but less common, to have a glass cutting head moveable only across the table (the X or Y direction, depending on the orientation), but such a cutter is less common.

Orders are turned into schedule and executed on shop floor. Schedules are delivered to each machine or glass processing equipment site with detailed fabricating information. Each product goes through a sequence of processes to get finished. Some of the process needs schedule transformed into special file to be executed on machine controlling software. Half made products are stored on site first and then moved to next site. Orders are either stored in some file in some format or in third party order management system. LAN exist on shop floor and the vast majority of critical machines are computer controlled.

The controlling of a glass production line requires the ability to create Given orders, create schedule that enables the line to fulfill the order correctly, efficiently and on time, and be able to handle rush orders and remakes, and to monitor machines and order progress at real time as well as to generate key statistics for analysis.

As noted above, glass processing equipment including glass cutting lines that have glass cutting tables, are well-known in the art. The glass cutting table is designed to cut generally rectangular glass sheets into a plurality of individual glass work pieces for subsequent manufacturing. The typical glass cutting line will also include a sheet feeding device upstream of the glass cutting table for feeding the glass sheets to be cut to the glass cutting table. The sheet feeding device may be in the form of an air float table to which individual glass sheets to be cut are fed, such as from a storage rack, and then aligned prior to forwarding to the glass cutting table.

A known glass cutting line arrangement will also include a sorting device downstream of the glass cutting table where the cut glass sheets are individually sorted by the specific glass work pieces into storage racks, generally called harp racks. A harp rack is provided with a number of slots, such as one hundred (100), for receiving the individual cut glass work pieces. The sorting device may be formed as an air float table with a plurality of adjacent harp racks. The harp racks are moved to the next part of the assembly operation.

Existing glass cutting lines typically utilize a production control system designed to minimize scrap. Previously, a specific cutting schedule for a production run, or single batch, was prepared in advance by the control system. The production run essentially corresponded to the number of harp racks and associated slots at the sorting station. Basically, older optimization programs were used to determine the optimal cutting schedule for filling the slots of the harp racks with the desired glass work pieces.

The cutting schedule essentially refers to the collection of layouts of the individual glass work pieces on all the glass sheets to be cut for the production run or batch. Following the batch production run, the filled harp racks were moved to the next location in the manufacturing process. The older optimization systems were limited by several problems. First, each system was limited by the number of available slots in the available harp racks. In general, the greater the number of slots the greater the yield since the optimizing program will have a greater number of pieces to select from to maximize product yield. Second, the harp racks generally could not be moved until the entire production run (batch) is completed, including the re-cuts at the end of the batch process. Third, the existing last sheet problem increased yield loss, even with re-cuts incorporated into the last sheet. Additionally, the existing older systems do not easily accommodate special pieces not accounted for in the production run.

The problems with older optimizers on cutting lines were addressed by Billco Manufacturing with the development of the BATCH BAN® glass equipment optimization product, now available from the assignee HP3 Software. This system provided a dynamic cutting line control system that includes an optimizer coupled to the controller of the glass cutting table optimizing the glass work piece layout on the individual sheets of glass. The optimizer includes a dynamically adjustable bias or biasing feature for favoring individual cut glass work pieces assigned to a leading storage position such as in a harp rack, whereby the bias will tend to position and cut the glass work pieces assigned to the leading position or harp rack on leading sheets to completely fill the leading harp rack in a minimum time. The control system further accommodates removal of a filled leading harp rack from the glass cutting line, with the system designating a new leading harp rack for the optimizer, which then dynamically adjusts the bias and associated cutting scheduling. This system provides an optimization system that operates "on the fly" allowing the previous batch type systems to be continuous or semi-continuous processes. The BATCH BAN® product is described, in part in U.S. Pat. Nos. 7,043,323 and 6,879,873 and these patents are incorporated herein by reference.

The BATCH BAN® product can also be described as overlapping batches that are dynamically optimized "on the fly". The BATCH BAN® product is not limited to the pieces designated for the storage locations currently at the cutter break out table. As noted in the '873 patent, it is also known to have one harp rack, or storage location, that is designated for "rare" pieces, or pieces that are not in the production cycle for some time, and this is called the rare rack. The rare rack acts as a storage location for pieces until needed, which is until the rack that they are associated with is moved into position on the break out table.

The commercial implementation of the BATCH BAN® product has resulted in large commercial savings where implemented. There is a need to expand the applications for the dynamic optimization system of the BATCH BAN® type product.

A separate glass processing step for many glass types is tempering through a tempering oven. Conventional tempering ovens will have a loading zone where the glass work pieces are loaded onto a moving bed of the furnace, a heating zone, a cooling zone and an unloading zone. A conveyer generally operates in a continuous fashion moving pieces through the tempering furnace.

It is known for workers loading a tempering furnace to have a specified layout prepared by a tempering furnace optimizer, such as, for example the BEDMATE™ product sold by PMC Software. The workers at the unloading zone will typically be provided a layout and identification of the work pieces as they exit the furnace so they can be sorted and racked accordingly. The input and output assistance is generally through graphical displays at each end of the furnace.

PMC Software attempted to increase productivity and throughput by trying to more fully automate processing from Cutting to Tempering. They provided a revised direct feed system in which cut glass is conveyed directly from the glass cutting line to the tempering furnace, eliminating the need to rack glass as it travels between these work centers in order to reduce the possibility of scratching or breaking caused by excessive handling. The direct feed system from PMC Software allows the user to process tempered requirements without the need to sort and rack cut glass. Operators still build tempered batch loads by viewing a TV monitor display and placing each lite within a batch on the load bed as shown on the display. In this direct feed automated process, orders are first scheduled for production and then optimized in batch type optimizer. Using the breakout sequence of the optimized layouts, a tempering optimizer portion of the system then determines the best orientation of the pieces to meet roll distortion requirements and to optimize the load bed. Once a production schedule is optimized, it is available to the cutting machine operator via the local area network. When an optimized layout has been cut and conveyed to the breakout table, the Breakout Display will automatically display that layout to demonstrate which lite is to be loaded first onto the conveyor feeding the load bed of the tempering furnace, as each lite is identified by a sequential loading number. To insure the orientation of each lite placed on the conveyor is correct, it is loaded base first. A sequence number is also displayed on the tempering furnace Load Display showing where each lite is to be placed within a tempering load. As a load exits the tempering furnace, the Off-Load Display identifies each lite within that load to assist off-load personnel in either packing or racking tempered lites.

It is well known that glass work pieces can be and are damaged at every stage of the production cycle. It is often considered that the more handling steps that are incurred with a work piece the greater the likelihood of damage to the work piece. In addition to scratching due to handling, miss-breaks, work pieces can be irreparably damaged in the tempering furnace itself. Regardless of the cause, the damaged pieces must be replaced. Traditionally, in batch production, these replacement pieces are run following the completion of the current batch. This final replacement batch can significantly hinder the production as it may result in exceptionally low yields as there can be very limited glass types in this final batch process.

It is an object of the present invention to improve the efficiencies of glass production lines by effectively tying all these exiting systems together with a global scheduler that can communicate with all of the cutting line components.

SUMMARY OF THE INVENTION

The above objects are achieved with the embodiments according to this invention, which in one non-limiting embodiment of the present invention is described.

Within the meaning of this application a glass production line references a glass work piece processing line in which glass work pieces are altered, such as for the construction of IG windows and doors and the like.

Within the meaning of this application a glass cutting table, or cutting table, is a glass processing unit that is designed to cut or score glass sheets into individual glass work pieces, sometimes called lites. The scored glass sheets will typically be separated into individual glass work pieces for subsequent processing, and into scrap elements for recycling, on a break out table. The break out table may be manual or automatic. The break out table may be considered as the last part of the cutting table for this application.

Within the meaning of this application a cutting schedule is the production schedule for the cutting table to follow. The cutting schedule will identify which sheet of glass is to be cut and what glass work pieces are to be formed from the sheet. The location of the individual glass work pieces on the sheet is also generally noted along with break out order and storage location (i.e. storage rack and slot position).

Glass work pieces within the meaning of this application references all glass work pieces throughout the glass processing process, including stock lites, individual cut pieces and remnant or offal pieces, also called offcuts. Offal glass work pieces are generally referencing the portion of a stock lite or sheet that remains after cutting one or more work pieces there from, wherein the remnant is large enough to meaningfully obtain future needed work pieces there from, whereby it is efficient to store the remnant for future use rather than scrap the unused portion.

The particular advantages of the present invention will be described in connection with the attached figures wherein like reference numerals represent like elements throughout.

BRIEF DESCRIPTION OF THE FIGURE

FIG. 1 is schematic figure of a use case described in appendix A

DESCRIPTION OF THE PREFERRED EMBODIMENTS

In accordance with one aspect of the present invention a glass production line comprises a style of lean manufacturing to solve many of the inefficiencies in the scheduling of orders through a glass plant. The main goal of the global scheduler of the present invention will be to dynamically adjust the flow of glass through a glass plant for maximum efficiency. To accomplish this task, the idea of scheduling racks of glass must be put aside and all glass pieces must be thought of as one large order. Each piece of glass will have a priority assigned to it based on some criteria assigned by the end user. These may include due date, customer, rush status, glass type, etc. . . .

After the pieces are prioritized, a list of destinations will be applied to each piece so its initial route through the plant is known. Orders that are "Rush" would be placed at the top of the priority list and done at the next available time. Orders that are "Remake" will have a priority assigned to them based on their urgency. Both "Rush" and "Remake" pieces will be placed into racks with other ordered pieces to push them through the system faster and to produce better yields.

Once the scheduler knows all the glass pieces required for the plant to produce, it can begin handing out jobs to the cutting lines in the required order. Since scheduling racks of glass can cause racks to not be full and take up space at the production processes, a dynamic racking system will be required.

Starting at cutting, as each cutter requests a new rack from the scheduler, the scheduler will determine which pieces can be cut at that cutter and create a rack of glass with the same destination codes that has the next priority. This will eliminate racks with fewer pieces and give the cutter optimizers more to work with therefore producing better yields. Pieces assigned to the cutting lines are determined by the resources available downstream (tempering, spacer bender, IG line, etc. . . . ). It has the ability to monitor each process on the plant floor and determine if the process is starving for glass or if it is overwhelmed. This feedback will cause the scheduler to dynamically adjust glass piece routes so that one process is not backed up and the glass gets through the plant in a timely manner.

The scheduler is aware of average processing time at a given process so it can hand out pieces at the right time. It knows how many racks are currently at a production process that are not yet consumed so it does schedule too many. It knows batch mode settings for a given process (tempering, spacer bender, etc. . . . ) so it can avoid frequent setups. It also knows the sizes of the pieces being scheduled and determines what type of rack to assign them to.

Very large pieces would be assigned to an A-Frame rack while smaller pieces would be assigned to a standard harp rack and for those customers with space limitations it could use a double height harp rack. Since the scheduler can automatically handle any remake at any time, every process in the plant has the ability to enter remakes. These remakes are recorded and tracked through the plant with the highest priority so they can meet their due date. They may jump in front of other pieces in some processes depending on their priority.

Tracking the time a piece of glass remains at a certain process is another feature and it is used to determine bottlenecks in the production sequence. It is also used for calculating overall completion time of a specific customer order. Saving this data along with historical trending provides a very accurate determination of the completion time.

After the glass has gone through the plant and is ready for shipping, truck packing must be taken into consideration. The scheduler knows the truck routes and determines how to pack the truck so that the first customer is packed last so it is at the beginning of the truck.

The following is a description of the backbone of the present scheduler to assist in understanding the design.

Situations Need to Consider:
1. size of orders, one may take days, another may take hours
2. overlapping of machines for different orders
3. machine may locates on different floors or buildings
4. each product has an operation path. For an existing product, system should be able to pull it from storage.
5. some raw material maybe in back order. An early order needs to be scheduled at a specified later time.
6. interaction between backbone and other ERP components
7. capacity constraints in terms of manpower, machines, stock and time
8. what if orders are so big that fulfilling each cost days or weeks? How to apply JIT scheduling on this situation?
9. differentiate internal orders (make to stock) from actual orders cause it has low priorities and the finished date is moveable
10. lot size (warehouse space) and safety stock
11. buffer size for each machine
12. conveyor vs. racks
13. prioritize not only by due date but also by other dimensions like order size and customer priority
14. what if network is down in the middle of executing a schedule, should client cache existing schedule and complete it before the network is on again?
15. overlapping of operation paths for different orders
16. Earliest starting date. Not all orders can be started right away. Some material may be in back order. This situation may be handled by the function of 'modifying existing orders'. When material becomes available, just add the order into schedule and set right priority for it.
17. Algorithm may need to spot bottleneck for each round of scheduling and try to maximize throughput for the bottleneck.

Key Decisions:
1. how much control should user have on scheduling process?
2. how to enable user to specify rules and strategies of scheduling?
3. is a fully manual scheduling necessary?
4. what information user wants to know about an ongoing order?
5. what user wants to know about machine and production status?

Things that May Affect Solution:
1. Does customer use any MRP system? If so, which one?
2. Are there any quality/testing process?

Ideas:
1. use backward scheduling
2. calculate lead time for each operation from history data
3. add an user specified insurance factor on top of lead time estimation, this factor could be somewhere from 5% to 15% or higher
4. user can preview the estimated schedule on next 2 hours, 4 hours or any other time
5. user can customize schedule and even 'freeze' it. A frozen schedule will be implemented as specified and won't be adjusted by events
6. a simulator is necessary
7. in the long run, backbone could evolve into an ERP system that covers inventory control, logistics, sales and marketing, accounting . . .
8. use product structure tree
9. Scheduling algorithm: when adding a order to existing schedule, first, try an order whose production route doesn't overlap with existing order in schedule. Second, try order whose route doesn't include the bottleneck for current schedule.

Use Cases: Create Schedules:
1. User adds orders into system with optional priority.
2. System presents scheduling rules with a list of options. Rules could be: first come, first serve; earliest due date; or shortest operating time, etc. There could be other additional rules like differentiating orders by customer or by order value.
3. User chooses one or a combination of rules.
4. User choose to create schedule
5. System creates schedule.
6. System presents that schedule is ready.
7. User approves schedule.
8. System dispatches schedule to clients at shop floor.

Alternate Scenarios:
user preview schedule by specifying a range of time before approving
user customize schedule during previewing
user freeze schedule
user view schedule in progress
adds new orders on top of current running schedule . . .
user change scheduling strategy . . . user
push rush orders into system . . . user add
remake into system . . .
user change priorities of the orders in the pool . . .
user removes orders from the pool . . .
user adds or removes machines from the availability list . . .

user adds new machine to floor, or remove existing machine
user specifies workflow for a product if not available
user schedules manually from scratch
user view estimated turnaround time for scheduled order
user print schedule or routing plan
user halt/cancel current running schedule
user prints label at station
user scans barcode at station Track Orders:
Manager requests information on order status. Information is presented on how much percentage of each order has been fulfilled, where those are item pieces in production line and estimate on completion time.

Monitor Machines:
Manager requests information on shop floor. System response with information about machine status, order and schedule currently assigned to each machine, incoming/outgoing rack status, production count, starving and blocking. Provide statistics like cycle time, down time. Provide analysis like bottleneck and capacity.

View Statistics—Provide Statistics of Interest.

Dispatch/Follow Schedule:
Worker at a machine pulls schedule out of the system. A list of tasks is shown for that machine. Tasks may further be optimized by specialized optimization software. Worker works on schedule. When work finishes, worker updates task item status either in piece or in rack. Status could be successful, unfinished or failure. For status of unfinished or failure, detail needs to be provided. After status updating, task list refreshes to reflect the change. (Question: what if optimization software changes the task sequence and rack assignment? How does backbone track that? If backbone doesn't know what pieces are leaving the site, it could affect the operation downstream.)

Simulate Scheduling (this is for Development and Marketing):
User setups shop floor. User defines a group of orders. System demonstrates in graphics how scheduled orders get fabricated on machines and flow through machines.

Avoid Traffic Jam:
Provide the means to avoid traffic jam.

Log Jobs Done:
Provide means to log jobs done on each machine.

View schedule history: Manager or scheduler could view history of schedule and production.

Non-Functional Requirements and Constraints:
1. Interoperate with order management systems and operation control and optimization software from different vendors for different operations
2. provide a system availability level of 99.99%
3. respond to operator inputs within 3 seconds
4. have a designed-in capability to maintain and evolve the system
5. adaptable to different way of transporting glass pieces on shop floor Risk List & Risk Management Plan:
The greatest risk is lack of customer involvement and feedback during the development. The other risk is lack of available existing similar software to compare.

Appendix A is a system requirements listing for the global scheduler of the present invention.

APPENDIX A: Software Requirements for Glass Fabrication Scheduling and Control System Vision:
Automate scheduling for glass fabricators to make the production process manageable and efficient.

Use Cases schematically shown in FIG. 1 diagram.

Use Case UC1: Manage Schedule
Scope: Glass Fabrication Scheduling and Control System
Level: user goal
Primary Actor: planner
Stakeholders and Interests:
Planner: Wants all orders fulfilled on time. Wants fast production with good throughput and yield. Wants to handle rush orders and remakes quickly, efficiently and handily. Wants to respond to changes on shop floor quickly.
Worker: Want the schedule to be practical and doable.
Manager: Wants to maximize production rate. Wants to minimize material and labor cost. Wants schedule history stored for accounting, management or analysis purpose. Wants good estimate on order turnaround time.

Preconditions:
Orders have been accepted. Production environment has been setup.

Postconditions:
Schedule is created and ready to be fulfilled on shop floor.

Main Success Scenario (or Basic Flow):
1. Planner chooses to create new schedule.
2. System presents a list of unscheduled orders.
3. Planner selects orders.
4. Planner set priority for each selected order. Priority levels include: low, normal, high and rush_order. Specifically, if an order is rush order, set its priority to rush_order.
5. System presents scheduling rules (including the rules for automatically adjusting schedule) with a list of options.
6. Planner selects rules.
7. Planner submits selection.
8. System presents summary of schedule input including orders, priorities and rules.
9. Planner approves schedule input.
10. System creates schedule.
11. System presents summary of the created schedule.
12. Planner approves schedule.

13. System stores the schedule, generates generic dispatch files (not bridge files) and makes them available to clients.
14. This use case ends.

Extensions (or Alternative Flows):
1a. Planner chooses to change current schedule:
   1. System presents a summary on current schedule with change options.
      1a. Planner chooses to add new orders.
         1. System presents un-scheduled orders.
         2. Planner selects orders.
         3. Planner set priorities for selected orders. Specifically, if an order is rush order, sets its priority to rush-order.
         4. Planner adds selected orders to new schedule.
      1b. Planner chooses to change priority of an existing order.
         1. System presents existing orders and their priorities.
         2. Planner selects an existing order.
         3. Planner changes the priority of the selected order.
      1c. Planner chooses to change scheduling rules:
         1. System presents current scheduling rules.
         2. Planner makes change on scheduling rules.
   2. Planner repeat step 1 until done.
   3. Planner submits change.
   4. System presents summary of change.
   5. Planner confirms change.
   6. System re-creates schedule.
   7. System presents summary of the new schedule.
   8. Planner approves new schedule.
   9. System stores the schedule, generates dispatch files and makes them available to clients on shop floor.
   10. This use case ends.
1b. Planner chooses to remove existing orders from current schedule.
   1. System requests administrator password.
   2. Planner enters the password.
   3. System presents orders in current schedule.
   4. Planner selects orders to remove.
   5. Planner submits the selection.
   6. System presents summary of removed orders and their progress.
   7. Planner confirms removal.
   8. System checks if any part of the removed orders is in production.
      a. Some orders are in production, which mean part of the order is either being fabricated, or has been partially fabricated and in waiting queue or outgoing queue on a station.
         1. System requests instructions on how to handle the pieces that have been fabricated for each of the relevant machine. A relevant machine is the one that has part of the removal order being fabricated, or that has partially finished order in waiting queue or outgoing queue.
         2. Planner enters instructions.
   9. System removes the submitted orders from schedule and recreate schedule.
   10. System presents summary of the new schedule.
   11. Planner approves schedule.
   12. System stores the schedule, generates dispatch lists and makes them available to clients on shop floor.
   13. Client presents highlighted message informing order is removed with instructions on how to handle the pieces left from the removed order.
   14. Worker confirms works on removed order has been terminated and instruction has been followed.
   15. System stores progress.
   16. This use case ends.
1c. Planner chooses to view current schedule.
   1. System presents summary of current schedule with information of its orders, priority of orders, scheduling rules and dispatch lists.
   2. User chooses to view detail of either an order or a dispatch list.
      1a. Planner chooses to view detail of an order
         1. System presents order detail information, including customer, purchase date, shipping date, line items and total value.
      1b. Planner chooses to view detail of a dispatch list.
         1. System presents detail information of the dispatch list, including assigned machine, sequence of jobs and corresponding production specification.
   3. This use case ends.
1d. Planner chooses to view schedule history.
   1. System presents options to search schedule by id or time frame.
   2. Planner enters search criteria and submits.
   3. System presents a list of schedules that satisfies the search criteria.
   4. Planner selects a schedule to view detail.
   5. System presents the detail of the schedule.
2a. Target order is not in system.
   1. System presents a list of order resources.
   2. Planners choose one of the resources.
   3. System presents a list of orders in selected resource.
   4. Planner selects orders to import.
   5. Planner submits selections.
   6. System presents summary of selected orders.
   7. Planner confirms importation.
   8. System imports selected orders.
   9. System returns to basic flow step 2.
   10. This use case ends.
3a. Product in selected order is not recognized.
   1. System presents a list of existing products with option of adding a new product.
      a. The unrecognized product is in the list
         1. Planner selects one of the listed products.
         2. Planner submits the selection.
         3. System stores the relationship.
      b. The unrecognized product is not in the list.
         1. Planner requests adding a new product.
         2. System switches to UC2 Extensions 3b-f for adding a new product.
      2. System returns to basic flow 4.
      3. This use case ends.
11a. Planner requests to print schedule.
   1. System presents a list of machines for selection.
   2. Planner selects machines.
   3. Planner submits selection.
   4. System prints complete dispatch lists for selected machines.
   5. This use case ends.

Special Requirements:
Scheduling algorithms should be added or replaced without change or reinstallation of either clients or server.
All schedules and changes need to be logged.
Different order formats from third parties should be added without rewriting or reinstalling server or clients.
For a mid-size shop, time to calculate a schedule should be within the range of a few seconds to a minute.
When network is down, worker continues reporting progress while client caches the reported progress locally. When network is back, server should be able to handle the accumulated progress information and makes it up-to-date.

Server only creates the generic dispatch list. Specific bridge files are generated by clients in JIT mode. By this way, server load is reduced. At the same time, client specific restriction is maintained on client side.

Technology and Data Variations List:

Orders may be imported from different third party software and in different formats. System needs to be able to support these formats and be extendable to new formats in the future.

Frequency of Occurrence: anywhere from a few times every day to once every a few days.

Miscellaneous:

At any time, there is one and only one live schedule for the whole shop.

When talking about schedule history, there has to be a way to differentiate one schedule from another. A unique schedule is identified when it is different from other schedules in terms of orders or order priorities or scheduling rules.

A dispatch list may change before it is fulfilled. Only the actual dispatch list implemented by a machine is stored for history.

Use Case UC2: Manage Production Resources

Scope: Glass Fabrication Scheduling and Control System

Level: user goal

Primary Actor: planner, manager

Stakeholders and Interests:

Planner/Manager: wants the system to reflect the manufacturers specific production practices accurately. Wants to update production resources settings quickly and handily. Wants current schedule adjusted to changes on production resources immediately.

Preconditions:

To setup a specific resource, other resources it depends on have been setup.

Post-Conditions:

New settings are saved. Related resources are adjusted accordingly. Current schedule is adjusted to reflect changes.

Main Success Scenario (or Basic Flow):
1. Planner requests to setup production resources.
2. System presents a list of production resources including: processes, lines, machines, buildings, products, routing vehicles, work time, raw materials and order resources.
3. Planner chooses to add a machine.
4. System presents a template for configuring machine.
5. Planner completes the template, providing information about its name, description, associated processes (one machine could accomplish multiple processes, for example, a cutter may do both cutting and edge deleting), production rate, building, status (enabled/disabled), material types and incoming and outgoing routing vehicles.
6. Planner submits the completed machine.
7. System validates the submitted machine.
8. System presents summary on the submitted machine.
9. Planner approves the machine.
10. System assigns a unique ID to the machine and stores it. Planner repeats step 3 to 7 until indicates done.
11. This use case ends.

Extensions (or Alternative Flows):
3a. User chooses to suspend an active machine:
 1. System presents a list of active machines.
 2. Planner selects a machine to suspend.
 3. System requests password.
 4. Planner enters password.
 5. System verifies the machine is cleared (machine clearance is defined in the miscellaneous part).
  a. System detects the machine is not cleared.
   1. System presents current work progress on the machine and requires it to be cleared.
   2. Planner indicates the machine becomes cleared.
   3. System goes back to step 5.
 6. System changes the machine status to 'suspended'.
 7. System recreates schedule.
 8. System compares the new schedule with the old one.
  a. New schedule is different from the old one.
   1. System presents summary of new schedule.
   2. Planner approves the schedule.
   3. System stores the new schedule and makes it available.
 9. System stores the machine suspension.
 10. System reports the machine has been suspended
 11. This use case ends.
3b. Planner chooses to add another resource:
 a. add a process
  1. System presents a template for a process.
  2. Planner completes the process template, providing information about its name and description.
  3. Planner submits the completed process.
  4. System validates the submitted process.
  5. System presents summary of the submitted process.
  6. Planner approves the process.
  7. System assigns a unique ID to the process and stores it.
  8. This use case ends.
 b. add a line
  1. System presents a template for a line.
  2. Planner completes the line template, providing information about its name, description, ordered member machines and routing vehicles between adjacent machines.
  3. Planner submits the completed line template.
  4. System validates the submitted line.
  5. System presents summary of the submitted line.
  6. Planner approves the line.
  7. System assigns a unique ID to the new line and stores it.
  8. This use case ends.
 c. add a building
  1. System presents a template for building.
  2. Planner completes the template, providing information about its name, location and description.
  3. Planner submits the completed building.
  4. System validates the submitted building.
  5. System presents summary of the submitted building.
  6. Planner approves the building.
  7. System assigns a unique ID to the new building and stores it.
  8. This use case ends.
 d. add a routing vehicle:
  1. System presents three types of routing vehicles including harp rack, A frame rack and conveyers.
  2. Planner selects one type
   2a. Planner selects harp rack
    1. System presents a template for harp rack.
    2. Planner completes the harp rack template, providing information about its ID, model number, dimension (width×length×height by inches), storage capacity (in pounds), max glass size (width×length by inches), min glass size (width×length by inches), slot width (in inch), number of slots and comment.
  2b. Planner selects A frame rack
    1. System presents a template for A frame rack.
    2. Planner completes the template, providing information about its ID, type, storage capacity (in pounds), dimension (width×length×height by inches), width of front ledge board (in inches) and width of back ledge board (in inches).
  2c. Planner selects conveyer
    1. System presents a template for conveyer.
    2. Planner completes the conveyer template, providing information about its ID, length, width, load capacity (in pounds) and max speed.
  3. Planner submits the completed routing vehicle.
  4. System validates the submitted routing vehicle.
  5. System presents summary of the submitted routing vehicle.
  6. Planner approves the routing vehicle.
  7. System stores the vehicle.
  8. This use case ends.
e. add raw material or component:
  1. System presents a list of raw material or component including glass stock type, spacer, frame, muntin and gas . . .
  2. Planner selects one raw material or component.
  3. System presents a template for the selection.
  4. Planner completes the template, providing information about its name, description and attributes specific to the selected type.
  5. Planner submits the completed template.
  6. System validates the submitted raw material.
  7. System presents summary of the submitted material.
  8. Planner approves the material.
  9. System assigns a unique ID to the raw material or component and stores it.
  10. This use case ends.
f. add a product
  1. System presents a list of product types including: windows, doors, IG units, laminated glass, coated glass, custom fabricated glass . . .
  2. Planner selects one product type.
  3. System presents a template for the selected product type.
  4. Planner completes the template, providing information about product name, description, production procedure (sequence of processes and associated raw material or component), and attributes specific to the selected product type.
  5. Planner submits the completed product.
  6. System validates the submitted product.
  7. System presents summary of the product.
  8. Planner approves the product.
  9. System assigns a unique ID to the product and stores it.
  10. This use case ends.
g. add work time:
  1. System presents two types of work time including regular time and overtime.
  2. Planner selects one type.
    2a. Planner selects regular time.
      1. System presents a template for regular time.
      2. Planner completes the template for regular time, providing information including shift hours, work days and holidays.
    2b. Planner selects overtime.
      1. System presents a template for overtime.
      2. Planner completes the template for overtime, providing information including day and time.
  3. Planner submits the completed work time.
  4. System validates the submitted work time.
  5. System presents a summary of the submitted work time.
  6. Planner approves the work time.
  7. System stores it.
  8. This use case ends.
h. add order resources:
  1. System presents template for order resource.
  2. Planner fills the template with information of resource name, resource URI, order file format type and description.
  3. Planner submits order resource template.
  4. System validates the submitted order resource.
  5. System presents summary of submitted order resource.
  6. Planner confirms the submission.
  7. System assigns a unique ID to the order resource and stores it.
  8. This use case ends.
i. add bridge file type:
  1. System presents template for bridge file.
  2. Planner fills the template with information of bridge file name, version. Specifically, planner is required to upload a mapping file that translates bridge into scheduler's internal format back and forth.
  3. Planner submits bridge file template.
  4. System validates the submitted bridge file type.
  5. System presents summary of submitted bridge file.
  6. Planner confirms the submission.
  7. System assigns a unique ID for the bridge file and stores it.
  8. This use case ends.
3c. Planner chooses to change availability of materials associated to a machine.
  1. System presents a list of materials.
  2. Planner selects a material.
  3. System presents a list of relevant machines and the availability of the material on each machine.
  4. Planner modifies availability of material on machines.
  5. Planner submits the modification.
  6. System presents a summary of the modification.
  7. Planner confirms the modification.
  8. System evaluates the modification against current schedule.
    8a. Material required for current schedule, which was available at first, becomes unavailable. In other words, some machine runs out of raw material for current schedule.
      1. System requests verifying work progress on the affected machines is UP to date such that no 'started' pieces relying on the unavailable materials are on the machine.
      2. Planner confirms the work progress is UP to date.
      3. System verifies there are no 'started' pieces relying on the unavailable materials on the machine.
  9. System recreate schedule according to the change.
  10. System compares the new schedule with the current one.
    a. New schedule is different from the current one.
      1. System presents summary of new schedule.
      2. Planner approves new schedule.

3. System stores the new schedule and makes it available.
11. System stores the modification on availability of material.
12. Report material availability has been changed.
13. This use case ends.

3d. Planner chooses to modify a resource:
1. Planner selects a resource to modify.
2. System presents editable detail of the resource.
3. Planner modifies the resource.
4. Planner submits modification.
5. System presents summary of the submitted modification.
6. Planner confirms the modification.
7. System evaluates modification against current schedule.
    4a. the modified resource is used in current schedule and the modification will cause schedule changed, in other words, the modified portion of resource is part of factors/parameters for scheduling algorithm.
        1. System recreate schedule according to the modification.
        2. System presents a summary on the new schedule.
        3. Planner approves the new schedule, thus the modification.
        4. System stores and makes the new schedule available to clients.
8. System makes adjustments on other affected resources and stores the modified resource.
9. System report resource modification successful.
10. This use case ends.

3e. Planner chooses to delete a resource:
1. Planner selects a resource.
2. Planner requests deleting the selected resource.
3. System presents summary on deleted resource.
4. Planner confirms the deletion.
5. System requests administrator password.
6. Planner enters password.
7. System evaluates dependency of current schedule on the deleted resource.
    a. Current schedule relies on the target resource.
        1. System displays a warning and prohibits the deletion.
    b. Current schedule does not rely on the target resource.
        1. System makes adjustments on other affected resources and stores the deletion.
8. System report deletion completed.
9. This use case ends.

Special Requirements:
Commonly used resources, for example, cutting process and glass types, should be shipped with the system and can be added or removed selectively.
Due to the complex relationship between schedule and resources, managing resource should be separated from scheduling. That is, we should minimize the effects on schedule from changing resource configuration.
Frequency of Occurrence: Occasionally
Miscellaneous:
Machine production rate could be updated according to historical data.
For most of the resources, they are configured once and almost never change, for example, process, building, product, routing vehicle. The only resources that changes and affects scheduling are machine running status (active/suspended) and raw material availability. These situations are handled explicitly in use cases.
A machine is cleared when it satisfies all of the following conditions: 1, It is stopped; 2, Work progress on the machine has been updated in the system; 3, Completed pieces on the machine have been routed to next process.

Use Case UC3: Simulate Scheduling
Scope: Glass Fabrication Scheduling and Control System
Level: user goal
Primary Actor: developer, salesperson, planner, manager
Stakeholders and Interests:
Developer: Want to test scheduling algorithms and strategies.
Salesperson: Want to demonstrate the software to potential customers.
Planner/Manager: Want to preview or research scheduling strategies.
Preconditions:
Production resources have been setup.
Post-Conditions:
No dispatch list is generated and distributed. No scheduling history is stored.
Main Success Scenario (or Basic Flow):
1. User requests to simulate scheduling.
2. System guides the users through the same process as described at UC1 to create a new schedule but in a simulation mode.
3. System indicates ready for simulation.
4. User launches simulation.
5. System starts to simulate execution of schedule. It presents an interface to show all the machines involved, incoming/outgoing workload and orders for each machine and transition of works from machine to machine. Information on the interface changes dynamically when simulation proceeds. At the time the schedule finished, all workload has been processed and the outgoing work at the last machine is 100% finished.
6. This use case ends.
Miscellaneous:
Some mechanism is needed to simulate the situation that imbalance of workload accumulates when schedule proceeds.

Use Case UC4: Monitor Production
Scope: Glass Fabrication Scheduling and Control System
Level: user goal
Primary Actor: planner, manager
Stakeholders and Interests:
Planner: Wants to monitor progress of schedule.
Manager: Wants to monitor real-time production measurements on shop floor. Wants to discover production issues immediately. Wants to know progress on order fulfillment. Wants to have a good estimate on turnaround time. Wants to use schedule history for better prediction in the future. Wants to recognize production bottleneck from accumulated data.
Worker: Wants his work accurately counted because his pay may relate to his production.
Salesperson: Wants to know available production capacity to determine if an order should be taken.
Preconditions:
A schedule is created and running.
Post-Conditions:
Schedule progress information is gathered and presented.
Main Success Scenario (or Basic Flow):
1. Planner requests to view progress of schedule.
2. System present orders in current schedule and progress for each of them in tables, charts or diagrams. Progress information for each order includes: fulfilled percentage, estimated completion time, comparison between estimated completion time and order due date.
3. This use case ends.

Use Case UC5: Run Schedule
Scope: Glass Fabrication Scheduling and Control System
Level: user goal
Primary Actor: worker
Stakeholders and Interests:
Worker: Wants to have the up to date schedule on hand. Wants to update work progress status. Wants to report and request remake. Wants to adjust rack assignment. Wants the schedule interoperates well with the specific optimizer on his machine. Wants to continue his work even when network is down. Wants to have instructions when needed. Wants schedule re-balanced to utilize available resources more efficiently.
Preconditions:
Schedule has been created and stored.
Post-conditions:
Dispatch list has been delivered to client. Work progress is reported and stored. Dispatch list is fulfilled.

Main Success Scenario (or Basic Flow):
1. Client probes for new dispatch list every a customized time interval.
2. System returns generic dispatch list for the requested client.
3. System displays the schedule with current job and its production specification highlighted. Worker could navigate through jobs forward or backward.
4. Worker completes current job.
5. Worker indicates current job is done.
6. System stores progress.
7. System evaluates current schedule against available resources and workload distribution with given rules to determine whether it needs to be adjusted.
    3a. Schedule should be adjusted.
        1. System adjusts the schedule.
        2. System stores evaluation result and the adjusted schedule.
        3. System makes the new schedule available.
8. System evaluates relationship between the client and the orders it is reporting.
    8a. The client is at the last process of the reported order.
        1. If all pieces of this order are completed, record this order as completed with current time as the completion time, then remove this order from current schedule.
9. Worker moves to next job and makes it current.
10. Repeat step 3 to 9 till schedule is done.
11. This use case ends.

Extensions (or Alternative Flows):
2a. Dispatch list needs to run through operating software on top of the machine.
    1. Client transforms the generic dispatch list into bridge file specific to the machine.
    2. Client prompts worker a new schedule is available.
    3. Worker imports the new schedule into the operating software.
    4. Worker runs schedule through the operating software.
    5. Worker indicates jobs completion when a unit of routing vehicle is full. When pieces become ready to be moved to next process, worker requests routing instruction through client. Then worker follows the instruction to move the pieces. After that, worker indicates that the pieces have been moved to next process.
    6. This use case ends.
2b. Worker needs to adjust rack assignment.
    1. System presents current rack assignment.
    2. Worker selects pieces or slot range on the current rack.
    3. Worker selects a new rack and a range of slots on it.
    4. Worker assigns the selected pieces to the new rack.
    5. This use case ends.
4a. Worker requests remake.
    1. Worker selects a task in schedule for remake.
    2. Worker requests remake for selected task.
    3. Client asks reason for remake. Worker could choose from a list of standard reasons or enters special reason.
    4. Worker inputs reason.
    5. Repeats step 1 through 4 until all remakes are entered.
    6. Worker submits remakes.
    7. Client presents summary of remakes.
    8. Worker approves remakes.
    9. Client sends all remake requests to system.
    10. System adds remakes to schedule.
    11. System updates schedule and makes it available to clients.
    12. This use case ends.

Special Requirements:
The business rules that evaluate rescheduling should be pluggable and could be fine-tuned.
Update messages from clients should not be lost when the network or the server is down.
All clients must synchronize to the same schedule at any time. The event that triggers schedule adjustment is from one client at a time. But the consequence affects all clients. When a schedule is adjusted, if some clients get the new schedule but others still use the old one, a consistency error could happen. Some kind of transaction mechanism is needed to take care of the schedule consistency among clients.

Technology and Data Variations List:
1. Dispatch list on individual machine may work on top of an optimizer. The dispatch list needs to be in format compatible with the third party optimizer.
2. Sometimes items are tracked with barcode. Client needs to be able to support reading barcode in different common standards.
3. Dispatch list for individual machine needs to be cached on client in case the network is temporarily down.
4. Dispatch list can be imported from a portable storage in case network is down.

Frequency of Occurrence: very often

Supplementary Specification:
1. Due to complexity and variation of glass fabrication process, scheduler should base its solution on the principle of simplifying and streamlining the process. Without knowing exactly how manufacturers handle their processes, rather than 'creates' fancy and complicated process, we should stick to the simple, reasonable and adaptable ones.
2. System should be able to handle fabrication process specific to individual customer.
3. System is built on Windows operating system and SQL server.
4. Given the fact large amount of data could be generated and accumulated for the database, to keep performance and scalability of the system, a data backup mechanism is needed to control the size of live database without losing data.
5. For debugging and trouble-shooting purpose, all events and operations have to been logged.

6. A piece in a dispatch list can be in five states: unassigned, queued, started, completed and damaged. Unassigned state means the piece has not been assigned to any machine yet. Queued state means the piece has been assigned to a machine to be fabricated but is not started yet. Started state means the piece is in production but may not be completed. When a piece is in started state, worker has indicated the piece is started but has not indicated its completion. Completed state means the piece has been fabricated and is ready for next process. When a piece is in completed state, worker has already indicated the piece is completed. Damaged state means the piece is damaged and needs to be remade. To re-allocate a piece from one machine to another, scheduler has to know exactly whether the piece is completed or not. It is out of the question for completed pieces. It is not an issue for queued pieces. It is an issue for started pieces. A started piece may have been completed, but worker has not indicated its completion yet. If at this time the piece is re-allocated to another machine, it is duplicated. So, in order to re-allocate started pieces, an extra step is needed that requires worker verifying the exact state (completed or not) for each started piece. This extra step brings in extra time delay and cost. To minimize this cost, the following rules are followed: A started piece in a dispatch list is never allowed to be reallocated to another machine.
7. A communication mechanism between scheduler and clients is needed to make sure that clients are quickly signaled when a new schedule is ready.
8. Client is able to update itself from the server.

Business Rules:
1. Rules on fabrication process:
   a. Cutting is always the first process an item goes through.
   b. If an item needs to go through any of the following processes: tempering, IG or laminating, it has to be washed first.
2. No machine can be suspended unless it is cleared. A cleared machine satisfies the following conditions:
   a. The machine is stopped.
   b. Job progress on the machine is fully updated.
   c. Finished pieces have been transported to next process.
   d. No pieces on that machine are in either 'started' or 'completed' state.
3. A machine can be removed only after it has been suspended.

Risk List and Risk Management Plan:
1. Risk: lack of user involvement during the development process.
   Management plan:
   a. Design the software such that it is flexible and adaptive to change.
   b. Try to test a workable version of product on user's site as early as possible to collect feedback.
2. Risk: scheduling strategy and algorithm.
   Management plan:
   a. Adopt best practice of glass industry.
   b. Use existing production scheduling model that is reliable and well researched.
   c. Separate the algorithm in a component so that it can be upgraded without affecting other parts.
3. Risk: assigning product pieces to routing vehicles and tracing their moving between vehicles.
   Management plan:
   a. Separate internal representation of schedule from mapping between product pieces and routing vehicle slots.

Glossary:
Planner: A person who is in charge of scheduling.
Scheduler: Synonym for this scheduling software.
Line: A sequence of machines to finish some specific work.
Process: A glass fabrication step, for example: cutting, tempering . . .
Product: Type of substance that manufacturer produces and ships to customers, for example, windows, IG units, and fabricated glasses.
Routing path: A sequence of processes to turn raw material into final products. Raw material: Substance that final products are made from. Typical raw materials include glasses, spacers, frames . . .
Routing vehicles: Tools to move partial finished products between machines. Typical routing vehicles include racks and conveyers.
Dispatch list: A sequence of jobs and their corresponding production specifications assigned to a machine. A dispatch list may need to be transformed into specific format to feed the operating/optimization software running on a machine.
Schedule: A set of dispatch lists assigned to shop floor. A dispatch list in a schedule is format neutral.
Schedule history: Schedule continuously evolves over time. Schedule history is snap shots of actually implemented schedule during this evolvement.
Production environment: Consists of all production resources and their relationships. Waiting queue: also called incoming queue, is a group of pieces that's waiting to be fabricated on a machine.
Outgoing queue: is a group of pieces that has been fabricated on a machine but has not been transported to next process. In other words, its all the completed pieces that still stay at a machine site.

Although the present invention has been described with particularity herein, the scope of the present invention is not limited to the specific embodiments disclosed. It will be apparent to those of ordinary skill in the art that various modifications may be made to the present invention without departing from the spirit and scope thereof. The scope of the invention is not to be limited by the illustrative examples described above. The scope of the present invention is defined by the appended claims and equivalents thereto.

What is claimed is:

1. A method of dynamically scheduling glass work pieces on a glass cutting line having multiple glass processing units including at least one a glass cutting table for scoring glass sheets into individual glass work pieces and separating into individual glass work pieces for subsequent processing, and into scrap elements for recycling, on a break out table, and at least one tempering oven for tempering glass work pieces, comprising the steps of:

Scheduling the glass work pieces on the multiple glass processing units, wherein the scheduling includes prioritizing each glass work piece and after the pieces are prioritized, a list of destinations are applied to each piece so an initial route through the multiple glass processing units of the glass cutting line is established;

Sending prioritized racks of glass work pieces to each cutting table;

Monitoring all glass processing units, including those downstream of each glass cutting table;

Rescheduling the glass work pieces on the multiple glass processing units at least with every new rack sent to each cutting table, wherein the rescheduling includes consideration of the monitoring of glass processing units downstream of each glass cutting table and reprioritizing each remaining glass work piece and after the pieces are reprioritized, a revised list of destinations are applied to each piece so an adjusted route through the multiple glass processing units of the glass cutting line is established.

* * * * *